United States Patent [19]
Sohol

[11] Patent Number: 5,263,760
[45] Date of Patent: Nov. 23, 1993

[54] PORTABLE SUN BLOCK

[75] Inventor: Robert M. Sohol, 5400 34th St., W. Bradenton, Fla. 34210

[73] Assignee: Robert M. Sohol, Naperville, Ill.

[21] Appl. No.: 28,663

[22] Filed: Mar. 9, 1993

[51] Int. Cl.⁵ .............................................. B60J 3/02
[52] U.S. Cl. ................................ 296/97.7; 248/205.9; 248/467
[58] Field of Search ................... 296/97.7,97.9; 248/205.8, 205.9, 362, 363, 467

[56] References Cited

U.S. PATENT DOCUMENTS

| | | | |
|---|---|---|---|
| 3,649,069 | 3/1972 | Zip | 296/97.7 |
| 4,351,557 | 9/1982 | Chary | 296/97.7 |
| 4,607,875 | 8/1986 | McGirr | 296/97.7 |

*Primary Examiner*—David M. Mitchell
*Assistant Examiner*—Andrew C. Pike
*Attorney, Agent, or Firm*—Charles J. Prescott

[57] ABSTRACT

A portable sun block releasably connectable onto a transparent non-porous panel such as a window of a vehicle. The device is particularly useful for being selectively positionable by a suction cup onto a vehicle window for blocking or reducing the intensity of sunlight or other vehicle's driving lights from entering into the vehicle and striking an occupant's eyes. With the inclusion of a unique suction release valve, a user may quickly and easily release the vacuum grip of the device against a window for repositioning and re-engagement or removal. By this arrangement, deployment against a window or the like is a simple one-step procedure whereby the valve is closed simultaneous with pressure against its control knob to re-adhere the device.

2 Claims, 1 Drawing Sheet

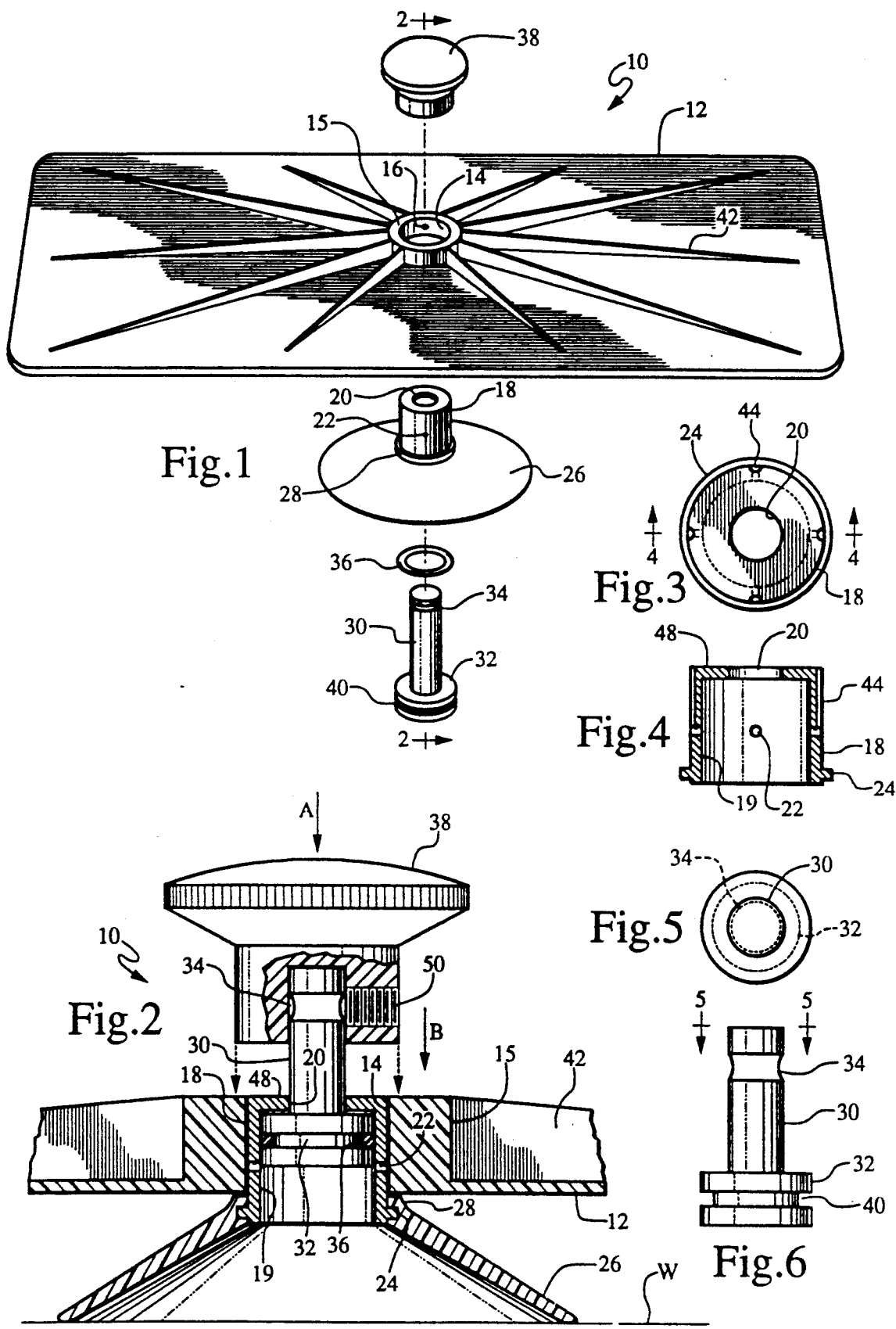

PORTABLE SUN BLOCK

BACKGROUND OF THE INVENTION

1. Scope of Invention

The present invention relates generally to sun shields or screens for transparent panels, and more particularly to a portable sun block releasably connectable to a window of a motor vehicle or the like.

2. Prior Art

Motorized vehicles are traditionally equipped with sun visors which are pivotally connected above the windshield of the vehicle. These permanently mounted sun visors may be pivoted downwardly into position to block the upper portion of the windshield or the upper portion of a front seat side window so as to prevent sunlight from striking an occupant's eyes. However, because of the fixed nature of these sun visors, they are of limited use, particularly with respect to low angles of sunlight, occupants in the rear seat of the vehicle, windows of motor homes, and with respect to other vehicles' driving light shining into any of these vehicles.

A number of devices have been patented in an attempt to overcome this limitation. One such device known to applicant is disclosed in U.S. Pat. No. 4,842,322 intented by Iu which teaches a sunshine dot sun shield in the form of a circular disc which, in its entirety, is similar to a giant suction cup. A limitation of this device is the ease with which it may be removed and the fingerprints left on the windshield when it is so removed. Practical size limitations also appear present.

Another device known to applicant is invented by Chary as disclosed in U.S. Pat. No. 4,351,557. This invention is directed to a light shield for vehicles wherein a light blocking shield is held in place against a window by mating magnets, one connected to the shield and one being positioned to the opposite or outer surface of the window. Although this invention claims ease of movement wherein the outside magnet follows along as the shield is repositioned, nonetheless the issue of wind stripping the outer magnet from the window, the scratching of the window, and the overall effectiveness of these magnets in accomplishing their attended purpose is in question. Additionally, should the shield be inadvertently removed, the outer magnet will likely fall and be lost.

A vehicle windshield shade is disclosed in U.S. Pat. No. 5,031,684 invented by Soong which teaches a windshield blind or shade held in place by a plurality of corner-positioned suction cups. This device has a somewhat different purpose than that of the present invention in that its intended use is while the vehicle is parked or otherwise unattended.

The present invention provides a portable lightweight sun block which is easily releasably connectable and removable from any transparent non-porous panel such as a vehicle window. The device is quickly repositionable and is particularly easy to remove from adherence to the transparent panel by the appropriate activation of a vacuum release valve.

BRIEF SUMMARY OF THE INVENTION

This invention is directed to a portable sun block releasably connectable onto a transparent non-porous panel such as a window of a vehicle. The device is particularly useful for being selectively positionable by a suction cup onto a vehicle window for blocking or reducing the intensity of sunlight or other vehicle's driving lights from entering into the vehicle and striking an occupant's eyes. With the inclusion of a unique suction release valve, a user may quickly and easily release the vacuum grip of the device against a window for repositioning and re-engagement or removal. By this arrangement, deployment against a window or the like is a simple one-step procedure whereby the valve is closed simultaneous with pressure against its control knob to re-adhere the device.

It is therefore an object of this invention to provide a portable sun block which is economical to manufacture and may be provided in a variety of shapes and sizes so as to be conveniently adhereable and easily releasable from a transparent panel such as a vehicle window.

It is another object of this invention to provide a vacuum release valve in conjunction with the suction adherence means of a portable sun block shade for the quick removal from, and repositioning of the sun shade onto, a vehicle window.

In accordance with these and other objects which will become apparent hereinafter, the instant invention will now be described with reference to the accompanying drawings.

BRIEF DESCRIPTION OF THE DRAWINGS

FIG. 1 is a perspective exploded view of the preferred embodiment of the invention.

FIG. 2 is a section view in the direction of arrows 2—2 in FIG. 1.

FIG. 3 is an end view of a vacuum sleeve shown in FIG. 2.

FIG. 4 is a section view in the direction of arrows 4—4 in FIG. 3.

FIG. 5 is an end view of a vacuum piston shown in FIG. 2.

FIG. 6 is a front elevation view of FIG. 5.

DETAILED DESCRIPTION OF THE INVENTION

Referring now to the drawings, the invention is shown generally at numeral 10 and includes a sun shield 12 in the form of a generally flat, relatively stiff rectangular sheet of either translucent or opaque material. The sun shield 12 may be thus fabricated of molded plastic material which is either tinted or totally opaque for either filtering or blocking sunlight. The sun shield 12 also includes stiffening ribs 42 which radially extend from a sleeve mounting hole 14 formed orthogonally to the sun shield 12 through a molded mounting boss 15.

Connected within the sleeve mounting hole 14 is a vacuum sleeve 18 as best seen in FIGS. 2 and 4. This vacuum sleeve 18 has an outer cylindrical surface which is matably engaged within the sleeve mounting hole 14 and is secured there by a set screw 16.

The vacuum sleeve 18 also includes an axial hole 20 formed in its bottom wall 48 opposite an open end of the vacuum sleeve 18. A plurality of vent holes 22 are formed at a mid-point along a cylindrical main bore 19 of the vacuum sleeve 18. A retaining flange 24 outwardly extending around and adjacent the open end of the vacuum sleeve 18 is provided to securely matably engage within a corresponding groove formed into a central mounting aperture 28 of a resilient molded suction cup 26. By this arrangement, the vacuum sleeve 18, when secured within the sleeve mounting hole 14, thus securely positions the resilient suction cup 26 adjacent and parallel to one surface of the sun shield 12 as best seen in FIG. 2.

A vacuum piston 32 having an annular groove 40 for receiving an o-ring 36 is also provided. This piston 32 and o-ring 36 are slidably translatable in the direction of the arrow in phantom within the main bore 19 as best seen in FIG. 2. By the positioning of the piston 32 so that o-ring 36 is between the bottom wall 48 and the vent holes 22, the suction cup 26 is unable to create a suction vacuum against a window or transparent panel W. However, when the piston 18 is moved downwardly in the direction of arrow B so that the o-ring 36 lies below the vent holes 22, the suction cup 26, when compressed against the window W will create a retaining suction vacuum so as to hold the device 10 there against.

To facilitate the alternate positioning of piston 18, the piston 18 includes a stem 30 which slidably extends through the axial hole 20 out beyond the opposite surface of the sun shield 12. A knob 38 is also provided held in place onto a distal end of the stem 30 by a set screw 50 engaging within groove 34. Thus, by depressing knob 38 in the direction of arrow A, the piston 32 moves a corresponding amount in the direction of arrow B so as to position the piston 32 in its lower suction-maintaining pisition. Simultaneously with this movement of knob 38 in the direction of arrow A, the suction cup 26 is adheredly engaged against the window W. Knob 38 also serves as a stop for the travel of piston 32 to prevent disengagement from main bore 19.

An important aspect of this invention is the simple removal of the device for either repositioning or storage. Because the sun shield 12 is considerably larger than the suction cup 26, and because the suction cup 26 is in close proximity to one surface of the sun shield, manual fingertip release of vacuum by picking up an edge of the suction cup 26 for removal in an otherwise well known manner is not possible. To therefore release the vacuum adhesion between the suction cup 26 and the window W, a user simply pulls the knob 38 in the direction opposite to that of arrow A, thus moving piston 32 into its vacuum releasing position, allowing air passage through vent holes 22, thus releasing the suction cup 26.

Again, applicant stresses that the exact shape of the sun shield, although preferred to be rectangular, is not to be considered a limiting aspect of this invention. The sun shield may be circular, oval shaped, elliptical, or any other convenient of desired configuration to satisfy a partiular application need. Likewise, the material from which the sun shield is fabricated, although preferred to be a plastic material, may also be a metallic or other non-metallic material satisfying the general requirements of being relatively stiff and either translucent or opaque in nature. To insure the free flow of air into and out of the vacuum sleeve 18, one or more longitudinal grooves 44 extending from the bottom wall 48 to one of the vent holes 22 may be provided. These longitudinal grooves 44 may be required where the vacuum sleeve 18 is closely mating within, or even press fitted into the sleeve mounting hole 14. Otherwise, where a set screw 16 is required, a sufficient gap is formed to allow the free flow of air through at least one of the vent holes 22.

While the instant invention has been shown and described herein what are conceived to be the most practical and preferred embodiments, it is recognized that departures may be made therefrom within the scope of the invention, which is therefore not to be limited to the details disclosed herein, but is to be afforded the full scope of the claims so as to embrace any and all equivalent apparatus and articles.

What is claimed is:

1. A portable sun block releasably connectable to a panel of a vehicle comprising:
    a sun shield in the form of a generally flat, relatively stiff translucent or transparent sheet having a sleeve mounting hole formed through a central point of, and orthogonal to, said sun shield;
    a resilient suction cup having a central aperture formed therethrough;
    a vacuum sleeve connected within said suction cup aperture and having a main bore and an axial hole smaller than said main bore formed through a bottom wall of said vacuum sleeve, an open end of said vacuum sleeve facing into and generally aligned with, a concaved surface of said suction cup;
    said vacuum sleeve extending from a convex surface of said suction cup and connected within said sleeve mounting hole whereby a suction surface of said suction cup is positioned from, and parallel to, a first side of said sun shield;
    a vacuum piston slidably positioned for axial movement within said vacuum sleeve and having a stem extending out through said axial hole, said piston sealably mating within said main bore;
    a knob connected at a distal end of said stem and positioned adjacent a second side of said sun shield;
    a vent hole formed through a side wall of said vacuum sleeve into said main bore;
    said piston axially movable within said main bore between a first position wherein said piston is positioned between said vent hole and said vacuum sleeve open end and a second position wherein said piston is positioned between said vent hole and said vacuum sleeve bottom wall.

2. A portable sun block as set forth in claim 1, wherein:
    said suction cup is simultaneously compressed and said piston is moved into its first position when a user manually pushes said knob and said sun shield against the transparent panel.

* * * * *